Feb. 14, 1967   F. N. MASTRUP   3,304,457
HIGH INTENSITY LIGHT SOURCE
Filed Sept. 21, 1961   4 Sheets-Sheet 1

FRITHJOF N. MASTRUP
INVENTOR.

BY
FRASER & BOGUCKI
ATTORNEYS

Feb. 14, 1967  F. N. MASTRUP  3,304,457

HIGH INTENSITY LIGHT SOURCE

Filed Sept. 21, 1961  4 Sheets-Sheet 3

FRITHJOF N. MASTRUP
INVENTOR.

BY
FRASER & BOGUCKI
ATTORNEYS

Fig. 5
RELATIVE COLOR DISTRIBUTION OF DISCHARGE IN HELIUM AND BLACK BODY RADIATION
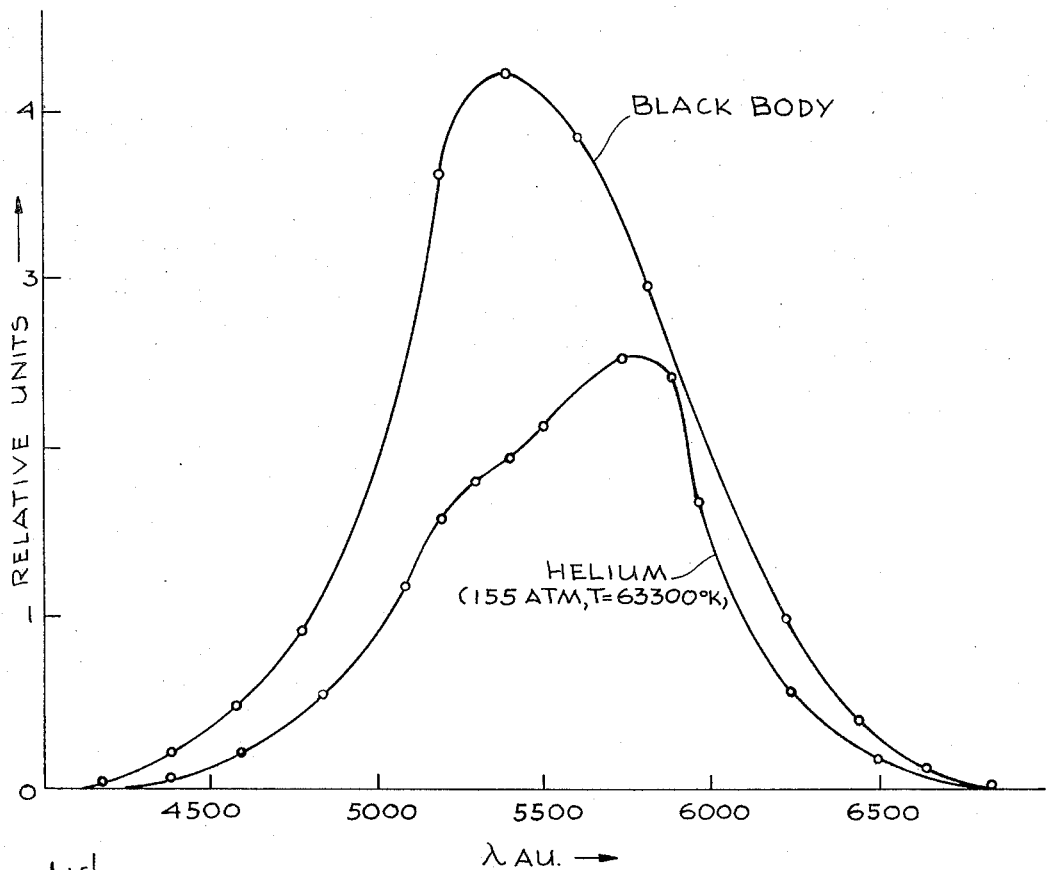
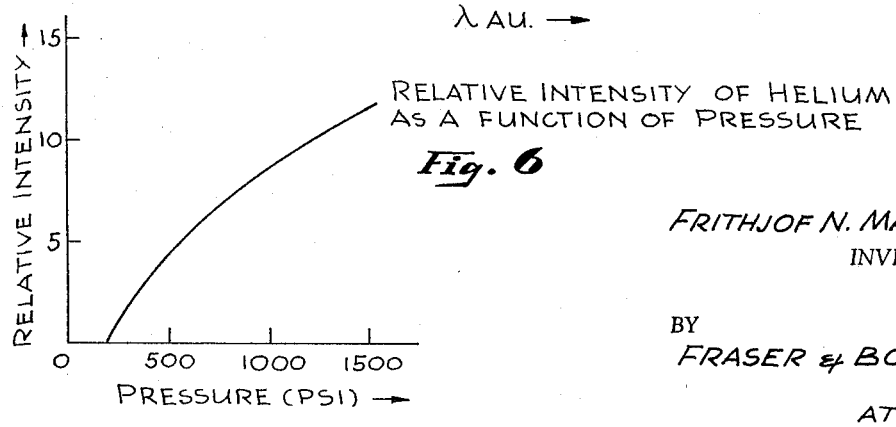
RELATIVE INTENSITY OF HELIUM AS A FUNCTION OF PRESSURE
Fig. 6
FRITHJOF N. MASTRUP
INVENTOR.
BY FRASER & BOGUCKI
ATTORNEYS United States Patent Office 3,304,457
Patented Feb. 14, 1967

3,304,457
HIGH INTENSITY LIGHT SOURCE
Frithjof N. Mastrup, Woodland Hills, Calif., assignor, by mesne assignments, to TRW Inc., a corporation of Ohio
Filed Sept. 21, 1961, Ser. No. 139,731
4 Claims. (Cl. 313—184)

This invention relates to radiation source devices of great brightness, and particularly to visible light sources providing a high luminous flux.

High brightness luminous sources of the kinds now available usually generate light energy from radiating plasmas. To obtain an energetic discharge so as to provide a high intensity radiating plasma, two opposed electrodes are often used along with a storage circuit which is charged from an external source and then discharged across the gap between the electrodes. Such arrangements, however, have somewhat limited practical utility because of erosion of the electrodes at the high voltages and temperatures needed for intense thermal radiation. Long life is desirable for any mechanism of this nature, but is a primary requisite for pulsed light sources operating at high repetition rates. Such devices can function as the equivalents of continuous light sources of great brightness and thus may serve as searchlights, as well as flashers for photographic purposes.

Certain factors limit the efficiency and brightness of thermal radiators as they are now known. A radiating plasma must approach black body radiation characteristics in the visible range in order to achieve the maximum brightness compatible with a given temperature. A mere increase in the temperature of a plasma is not enough for greater brightness, if the plasma is not capable of making best use of the increased temperature. Black body conditions cannot be obtained in many instances because the radiant energy may in large part consist of line emission, not continua, or emissions outside the visible wavelength range.

It is therefore an object of the present invention to provide an improved thermal light source having a high luminous flux.

Another object of this invention is to provide a high intensity pulsed light source which is capable of long term operation at a high repetition rate.

Systems in accordance with the invention provide thermal light sources of extremely high luminous flux by arranging a number of electrodes about a common counter-electrode and providing a substantially simultaneous fast discharge between the electrodes in a selected, high pressure gas. The arrangement is such that the radiating plasma provides a pulsed radiation of extreme brightness over a relatively large area with relatively little erosion of the electrodes.

A feature of the invention is the arrangement and use of multiple discharge electrodes such that substantially simultaneous individual discharges are created. For a discharge of a given total power, the brightness of each individual discharge is less than a single discharge would be. The area of the discharge increases faster than the brightness decreases, however, so that the product, or luminous flux, is greater because of the multiple electrodes and parallel discharge.

Another feature of the invention is the employment of a relatively slow charging circuit for storing energy and a fast discharge circuit for simultaneous discharge across the electrodes. The charging circuit is coupled through low inductance circuits to individual storage capacitors for each of the electrodes. As between individual capacitors, there is a sufficiently high relative inductance to effectively disconnect the capacitors during discharge. Simultaneity of discharge is aided by photo-ionization of the plasma.

In accordance with other aspects of the invention, highly radiative plasmas are obtained by which brightnesses approaching the theoretical limits for thermal sources under like conditions are realized. Using very high pressures and specific gases, the radiative plasma can be made to reach very high temperatures while still maintaining a sufficient continuous absorption coefficient in the visible range to assure almost black body radiation.

A better understanding of the invention may be had by reference to the following description, taken in conjunction with the accompanying drawings, in which:

FIG. 5 is a graph of wavelength versus relative amplitude units, showing the comparison between actual radiation obtained with discharge in a helium atmosphere and black body radiation; and FIG. 6 is a graph of relative intensity versus pressure, showing the variations encountered with helium as the radiating gas.

Figure 1:
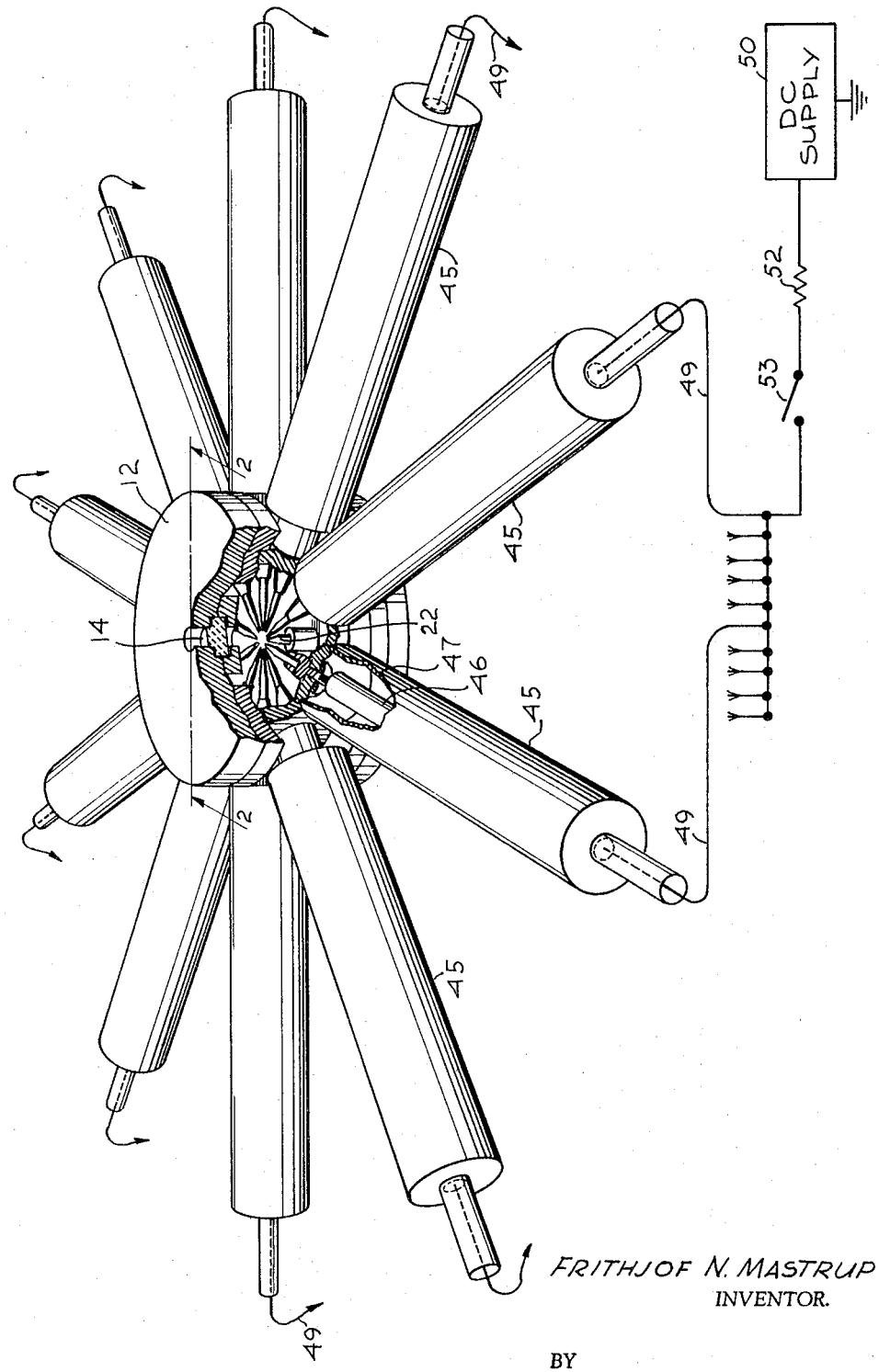
FIGURE 1 is a perspective view, partly broken away, of one form of pulsed light source in accordance with the invention.
Figure 2:
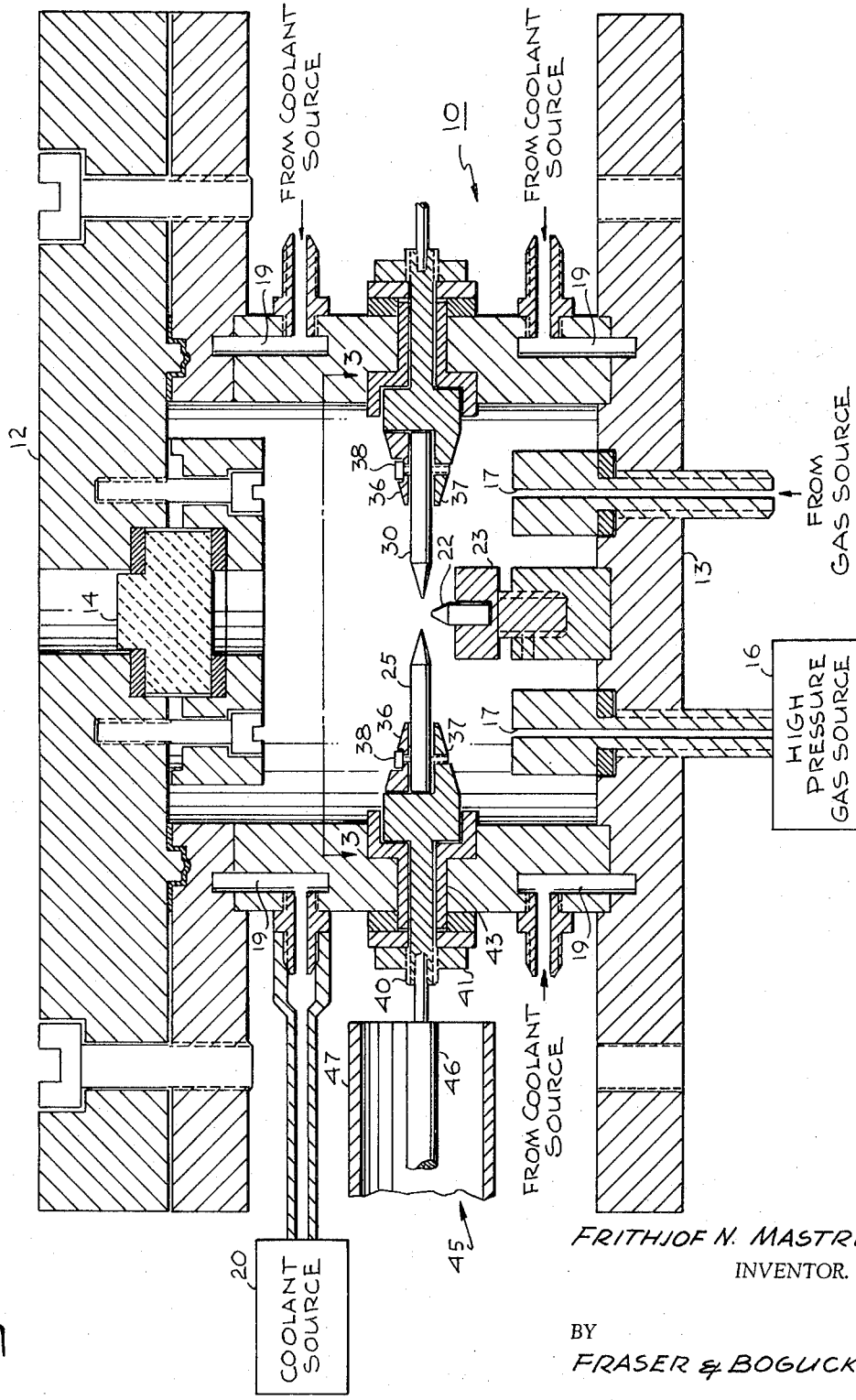
FIG. 2 is a side sectional view, taken along the line 2—2 of FIG. 1, and looking in the direction of the appended arrows.
Figure 3:
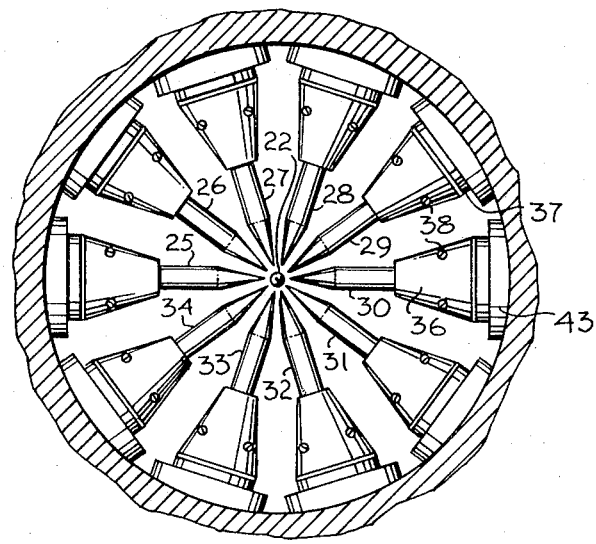
FIG. 3 is a plan sectional view, taken along the line 3—3 of FIG. 2, and looking in the direction of the appended arrows.

In the detailed system shown in FIGS. 1 to 4, for generation of pulsed high intensity light, most of the operative elements are contained within a steel pressure chamber 10. The chamber 10 should, in the extreme case, be capable of withstanding up to several hundred atmospheres of internal pressure, although lesser pressure levels will usually be employed. The chamber 10 is formed as a cylinder having top and bottom (as seen in FIGS. 1 and 2) end plates 12 and 13, respectively. Most of the structure of the system is symmetrically placed relative to the central axis of this cylinder. Emitted light is directed through an aperture in the top end plate 12 within which a quartz window 14 is mounted concentric with the central cylinder axis. Appropriate temperature and pressure seals (such as the gasket and bolted sealing ring shown for attaching the quartz window 14 to the top plate 12) are used throughout, but for simplicity will not be described in detail. It should be understood that this is an example only of one type of chamber which may be used and that many variations may be made for mobility, ease of access, and like features.

For most applications, it may be desired to concentrate or direct the radiation from the source in a particular way. Thus, the quartz window 14 may be enlarged and the interior of the cylinder may be formed as a highly reflective parabolic surface if the system is to be used in a searchlight application. If the system is to serve as a light beacon, the window may be curved as well as extended. These and a wide range of other variations are not shown in detail but will be understood to be available.

A chosen gas, here helium, is maintained within the 10 chamber at the desired pressure level and is supplied from a high pressure source 16 coupled through inlets 17 in the chamber walls. To prevent an excessive rise in the ambient temperature of the gas during a long sequence of rapidly repeated discharges, the walls of the chamber 10 are formed to include cooling passages 19 within which a suitable coolant (e.g., water) is circulated from a source 20.

The walls and end plates 12, 13 of the chamber 10 are coupled to a source of common potential and thus appear as electrical ground. A common counter-electrode 22 of tungsten is set in and supported by a conductive base 23 and is thus also electrically grounded. The common counter-electrode 22 is advantageously placed so as to lie along the central axis of the cylinder. A group (here ten) of individual tungsten electrodes 25 to 34, inclusive, are disposed in a common plane normal to the central axis and symmetrically placed along different radii relative to the central axis. The individual electrodes 25 to 34 (best seen in FIGS. 1 and 3) are cylindrical rods which terminate adjacent the common counterelectrode 22 in tapering tips which are separated by like gaps from the electrode 22.

To maintain the individual electrodes 25 to 34 in fixed and precise position, but electrically insulated from the chamber 10 walls, a special feed-through arrangement is used. The electrodes are each gripped between separate parts 36, 37 of a conductive clamp member which are held tightly together by bolts 38 on each side of the electrode. The clamp member includes a terminating lead 40 which extends outside the chamber 10 through an aligned wall aperture, and which is threaded into an external nut 41 to hold the assembly in fixed position. To maintain a gas-tight seal while holding the clamp member electrically insulated from the chamber wall, high dielectric strength sleeves 43 are used about the parts 36, 37, and 40 of the clamp member.

An individual coaxial capacitor 45 of about 0.1 $\mu$f. is coupled to each of the electrodes 25 to 34 at the terminating lead 40. Electrical connection at the discharge side is made from the center plate 46 of the capacitor 45, with the outer plate 47 being coupled to the chamber 10 wall. Relative inductance values in the capacitor 45 circuits are made use of in this arrangement, and may conveniently be considered in terms of the charging and discharge sides of the capacitor 45. For the design shown, a typical inductance value of 0.1 $\mu$h. exists at the discharge side, with a typical value of 0.25 $\mu$h. at the charging side. The total inductance at the discharge side must be increased to account for the gap between the electrodes and the electrode connectors, this being found to add another 0.02 $\mu$h.

Figure 4:
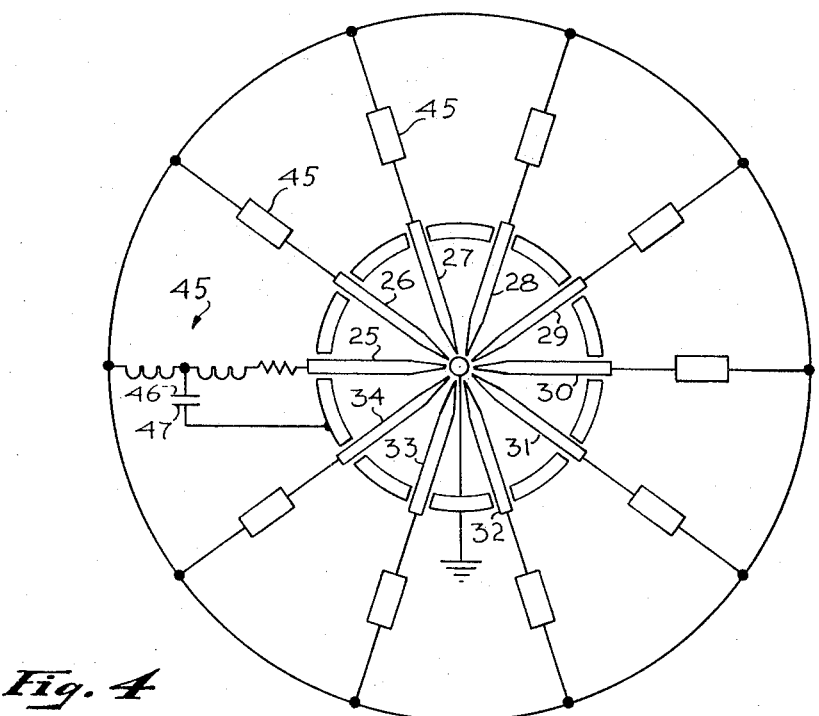
FIG. 4 is a schematic circuit diagram of the organization of the elements in one circuit in accordance with the invention.

Each of the coaxial capacitors 45 is connected to a common charging circuit through a length of lead wire 49, which is made sufficiently long to provide a relatively high inductance value (here about 1.9 $\mu$h.). Total inductance at the charging side is thus in excess of 2.1 $\mu$h. As best seen in FIG. 4, these lead wires 49 are coupled together into the charging circuit, which is driven from a high power direct current (D.C.) supply 50. Connection to the lead wires 49 is made through a charging resistor 52 and a switch 53 which control the repetition rate and the on-off condition, respectively, of the system. Note in FIG. 4 that the schematic representation of the circuit equivalents for a single lead wire 49 and coaxial capacitor 45 constitutes series inductances shunted to the chamber wall by an intermediate capacitor. The capacitor 45 circuit also contains some internal resistance, which is found to be about 0.07Ω for the unit described. The high power D.C. supply 50 is, in this example, a 20-kilovolt, 10-kilowatt rated unit.

In operation, flashes of high brightness distributed over a relatively large area and occurring at a high repetition rate are generated by the arrangement of FIGS. 1 to 4. When the switch 53 is closed, current from the power supply 50 is fed in parallel to the coaxial capacitor 45 through the charging resistor 52. The value of the charging resistor 52 determines the time required for the capacitors 45 to be charged to the breakdown level, and is chosen here to provide a repetition rate of about 100 flashes per second, although this may be varied within wide limits. The arrangement acts to charge the capacitors 45 substantially identically during the charging interval, but at the same time provides effective electrical disconnection of the circuits of the individual electrodes 25 to 34 during discharge. The relationship between the relatively low inductance at the discharge side and the relatively high inductance at the charging side of each capacitor 45 is important in this regard. When the first discharge occurs at an electrode, the high inductance as between parallel capacitors 45 restricts the passage of reverse currents between the separate electrodes 25 to 34. Current flow in the relatively low inductance discharge circuits is therefore greatly favored. Substantial simultaneity of discharge at all gaps is effectively insured by photo-ionization in the gap region, which is created as soon as discharge is initiated. The discharge is short and terminates when the potential difference between the electrodes drops below the excitation potential of the gas. There is good control of the pulsed radiation with this arrangement without the need for special triggering or firing techniques.

As soon as the discharge terminates, the charging action begins again for the succeeding pulsed discharge. With a repetition rate of about 30 to 100 flashes per second or more, the resultant illumination is sufficient for use in searchlight applications. The important considerations as to life of operation are wear of the electrodes and overheating of the helium atmosphere. Prior art systems have not only tended to erode the electrodes very rapidly, over a very few shots, but have often been subject to complete fracture of the electrodes. In contrast, systems in accordance with the invention distribute the power of the discharge and lengthen the electrode life by at least several orders of magnitude. Further, although the temperature of the radiating plasma in the vicinity of the electrodes reaches high levels, the atmosphere as a whole does not become thermally active. Usually, if operation is not continuous, circulation of the coolant through the chamber walls is not required.

An important feature of the present invention is the attainment of a high brightness even though a large discharge area is employed. Luminous flux (L) in lumens is computed as being equal to $\gamma$ times the brightness (B) in candles/cm.$^2$ times the effective emitting area (A) in cm.$^2$, where $\gamma$ takes the symmetry of the radiation field and the subtended solid angle into account. With a given energy in the discharge, it would ostensibly appear that brightness would diminish in proportion to, or faster than, the area increased. In the present system, however, while the brightness of each individual discharge does diminish for a given total power, the diminution is at a lesser rate than the increase of area. Hence a greater luminous flux is obtained for a given total power.

The temperature attained in the radiating plasma is approximately 50,000° K. or more, and the pulse width is of the order of several microseconds. When the system is operated to provide such flashes at a high repetition rate, therefore, the operation is the equivalent of a continuous emitter and readily comparable to a carbon arc thermal source. For moderate pressures, the brightness is at least 10$^7$ candles/cm.$^2$, and with the mechanism of FIGS. 1 to 4 the effective emitting area is about 1 cm.$^2$. Using a conservative discharge rate of approximately 35 flashes per second and a pulse width of about 2.7 $\mu$sec., the source is "on" for nearly 0.1 millisec./sec. The average brightness, therefore, is about 10$^3$ candles/cm.$^2$ under even these low duty conditions. As is shown below, however, material increases in repetition rate and brightness do not affect operative life or characteristics. In addition, by using larger electrodes and greater power, the emitting area may be increased without loss of brightness and without shortening the pulse width.

The principal physical problems involved in providing a high brightness thermal light source may be viewed with regard to the efficiency with which thermal energy is converted to useful radiant energy. The radiating plasma should be highly ionized and near thermodynamic equilibrium and provide substantial radiant energy throughout at least the principal part of the visible spectrum. Basically, the ideal radiator for these purposes is one which has a very high absorption coefficient ($k_v$)

in the visible range at very high temperatures (in excess of 50,000° K.). It will be recognized that the limiting intensity of a thermal radiator at any frequency for a given temperature T is the intensity of a black body radiator at that frequency. If the limiting intensity is closely approached for a given temperature with an emitting medium, greater intensity can be obtained only by raising the temperature, and not by choosing a different emitting medium having a higher absorption coefficient.

Excellent spectral energy distributions are obtained in accordance with the invention by establishment of a high temperature plasma having a high coefficient of absorption at visible wavelengths. Helium is preferred in the specific example given because it has very desirable properties in the chosen temperature range. A considerable amount of visible radiation is also contributed by bound-free energy transitions. The brightness of a continuous spectrum light source appears much greater than a line source of comparable intensity because the sensitivity of the human eye to any specific wavelength is limited. The bound-free continua of helium emit in the near ultraviolet region when the radiating atoms are unaffected by plasma interactions. In high density gaseous media, in accordance with the invention, however, the ionization energy of the atoms is lowered, which results in a shift of all bound-free continua to longer wavelengths. In consequence, the bound-free continua of helium are shifted, under the high pressure discharge conditions, into the visible or infrared regions.

In addition, line emissions from helium are subject to heavy line broadening mechanisms, so much so that the emissions appear almost as continua, and contribute appreciably to the intensity. The line broadening results primarily from randomly distributed electric fields within the plasma acting upon the radiating atoms in what are known as the linear and quadratic Stark effects. The strong sensitivity of the spectral lines to the Stark effects distributes the coefficient of absorption over a comparatively large wavelength range, reducing the absorption losses in the line center.

Another advantage derived from the use of helium is in the high temperatures which are obtained with relatively low energies. Helium has a relatively high excitation potential at low temperature and thus has a low conductivity. Accordingly, high temperatures are established within the medium in order to transport the energy. The absorption coefficient is maintained sufficiently high by the maintenance of higher pressures within the gas. The spectral energy distribution for discharge in a helium atmosphere under the detailed conditions given herein may be compared to the limiting black body radiation by reference to FIG. 5.

For other lower temperatures, gases of lower excitation potential (e.g., hydrogen and argon) may be selected, so as to provide some improvement in absorption coefficient. At lower temperatures and pressures, both hydrogen and argon provide more radiative plasmas than does helium. Argon, for example, becomes fully ionized and has high emissivity at low pressures, but suffers from an intensity loss at immediately higher pressures. A mixture of gases might be employed. With any of these or like gases or mixtures, the thermodynamic conditions established are such that there is substantial equilibrium and high ion and electron densities.

In an example of the operation of the system, the helium gas within the chamber 10 was maintained at a pressure of 155 atmospheres. The spectral energy distribution was derived from measurements of the intensity of the source. These were obtained both by establishing the luminosity of the discharge relative to a standard comparison source, with due compensation being made for the repetition rate, pulse length, and color differences of the source, and by calibrating the intensity of the discharges against standard light flashes. The latter measurements were made by photographic techniques, using varying calibrated exposures to relate photographic densities to intensity ratios.

Results of such investigations reveals that the spectral energy distribution of the discharge at 155 atmospheres is quite continuous. Line emissions observed at lower pressures are remarkably broadened, so as to form an unrecognizable part of the continuum. This substantiates the high degree of ionization and high temperatures established within the chamber. Further, the uniformity of the spectral distribution confirms the fact, shown in FIG. 5, that the radiation approaches that of a black body.

By then calculating from the luminous intensity, it was found that the brightness at the pressures of 155 atmospheres was approximately $1.62 \times 10^7$ candles/cm.$^2$. The temperature under these conditions was determined by assuming that a selected spectral line (the He(I) line, $\lambda_0 = 5876$) approaches limiting black body intensity at its center. Then, knowing the intensity, the temperature was computed from the known relationship to the limiting black body intensity by an iterative procedure and was found to be about 63,300° K. At this temperature the limiting brightness is about $3.25 \times 10^7$ candles/cm.$^2$, so that there is very effective use of the high temperature distributions of 155 atmosphere flash and a black body flash at the same temperature as seen by an observer. The relative units are the product of the intensity and the relative sensitivity of a standard observer at the various wavelengths. Plots of discharges made at lower pressures show progressively weaker approaches to black body conditions. Computations of temperature made at lower densities verify the value of the level given above (63,300° K.). In this method, the intensity ratio of an He(I) and an He(II) line was related to the temperature with extremely high accuracy. According to this method, for example, a temperature of 50,000° K. was reached at a pressure of 79 atmospheres.

These relationships establish the practicality of and the mechanism for further increases in brightness. In brief, the pressure may be increased to values at which pressure containment and electrode erosion are the limiting factors. The variations in relative intensity encountered with helium as the radiating medium are shown in FIG. 6. Electron and ion densities approach the fully ionized condition ($10^{19}$/cm.$^3$ for helium at 155 atmospheres).

The use of a pulsed light source as a continuous emitter system, of course, requires long electrode life, and systems in accordance with the invention exhibit remarkable stability in this respect. An initial spacing of 0.020" between electrodes in the system of FIGS. 1 to 4 was increased only to 0.040" after approximately 40,000 discharges at a repetition rate of 31 flashes per second. No appreciable diminution in the intensity of the flash was apparent. Further, the plasma did not become overheated even to an extent at which use of coolant was required. Consequently, systems using simultaneous discharges from a number of electrodes at a high repetition rate provide novel and useful light sources which are the equivalent of continuous emitters. No limitation on the repetition rate should be understood from the figures given, however, because under the given conditions no significantly greater wear is encountered at 120 pulses per second.

Some further understanding of the plasma phenomena involved in thermal sources has been gained by observations of systems in accordance with the invention. The breakdown voltage $V_0$ is not directly dependent upon pressure, but instead varies as $$V_0 = \sqrt{A + B \cdot P_0}$$

for the electrode configuration of FIGS. 1 to 4, where A and B are constants which are dependent upon the electrode separation, and $P_0$ is the filling pressure. In general, A decreases and B increases with decreasing electrode separation. The temperature (T) which is attained in the discharge is found to vary as $$T = \alpha_1 + B_1 V_0^2$$

where $\alpha_1$ and $B_1$ are again constants. Because the discharge energy W varies as the square of the breakdown voltage, in accordance with $W = 0.5CV_0^2$, this suggests a direct relationship between discharge temperature and discharge energy. Such a relationship is confirmed by measurements which have been made of temperature as a function of pressure.

Other gases than the helium, hydrogen and argon, which have been discussed, may be used under different conditions. Hydrogen will preferably be used at relatively lower pressures and temperature than helium, because, due to its lower excitation potential, it provides a closer approximation to black body radiation at lower pressure. Argon exhibits a rapid rise in emission intensity at lower pressures, but does not have a broad spectral distribution in the emission pattern.

A number of alternative arrangements and uses will suggest themselves to those skilled in the art. The system may be used as a pulsed light source, for example, for photographic or timing purposes. Different numbers of electrodes may be employed, and the charging and firing circuits may use any of a number of expedients. For example, a thyratron circuit may be used to control the coupling of the coaxial capacitors to the power supply and to provide a triggering of the discharge.

While a number of variations suitable for use in pulsed thermal light source systems in accordance with the invention have been described, it will be apreciated that the invention is not limited thereto. Instead, the invention should be considered to include all modifications and alternative forms falling within the scope of the appended claims.

The embodiments of the invention in which an exclusive property or privilege is claimed are defined as follows:

1. A high intensity thermal light source including the combination of a chamber containing a gas under a pressure in excess of 50 atmospheres, a common electrode within the chamber, a number of electrodes disposed symmetrically about the common electrode and spaced equally apart therefrom in a plane substantially normal thereto, and means coupled to the electrodes for providing a substantially simultaneous discharge from each of the electrodes to the common electrode and with each discharge having a time duration of the order of a few microseconds.

2. A high intensity thermal light source including the combination of a chamber containing a gas under a pressure in excess of 100 atmospheres, a common electrode within the chamber, a number of individual electrodes disposed symmetrically about the common electrode in a plane substantially normal thereto, a number of capacitive storage circuits, each coupled to a different one of the individual electrodes at a discharge side and each having an inductance at its charging side which is high relative to the discharge side, and power supply means coupled to the charging side of each of the capacitive storage circuits with said power supply means and said storage circuits being constructed and arranged to provide substantially simultaneous arc discharges having time durations of a few microseconds from each of said individual electrodes to said common electrode.

3. A high luminous flux light source system including the combination of chamber means maintaining a helium pressure in excess of about 100 atmospheres, a center electrode within the chamber means, a plurality of individual electrodes symmetrically placed about the center electrode and spaced apart therefrom in a plane substantially normal thereto, the proximate surfaces of the center electrode and individual electrodes providing a relatively large discharge area, and means for providing high energy time concurrent discharges between the individual electrodes and the center electrode substantially simultaneously with said concurrent discharges having a time duration of the order of a few microseconds so that the combined output light flux substantially exceeds the intensity obtainable from dissipation of the same electrical energy in a single arc discharge.

4. A thermal light source having long life and providing a high luminous flux, including means maintaining a low conductivity, high excitation potential gas under a pressure exceeding 100 atmospheres, a common central electrode, a number of individual electrodes disposed symmetrically and with like spacings and angular orientations relative to the central electrode, the individual electrodes having relatively large discharge areas, and means coupled to the individual electrodes for providing substantially simultaneous discharges between the individual electrodes and the central electrode with said discharges having a combined time duration of the order of a few microseconds.

References Cited by the Examiner

UNITED STATES PATENTS

| | | | |
|---|---|---|---|
| 789,449 | 5/1905 | Poulsen | 315—243 X |
| 2,241,968 | 5/1941 | Suits | 313—184 |
| 2,459,516 | 1/1949 | Francis et al. | 313—113 |
| 2,716,198 | 8/1955 | McCallum | 313—231 |
| 2,964,678 | 12/1960 | Reid | 315—111 |
| 3,064,153 | 11/1962 | Gage | 315—111 X |
| 3,141,111 | 7/1964 | Godlove | 315—163 X |

FOREIGN PATENTS

| | | |
|---|---|---|
| 589,240 | 6/1947 | Great Britain. |

OTHER REFERENCES

Cobine, James D.: Gaseous Conductors, McGraw-Hill Book Co., Inc., 1941, page 536.

JAMES W. LAWRENCE, *Primary Examiner.*

GEORGE N. WESTBY, *Examiner.*

L. D. BULLION, P. C. DEMEO, *Assistant Examiners.*